United States Patent [19]
Franklin

[11] Patent Number: 5,437,222
[45] Date of Patent: Aug. 1, 1995

[54] GRILL AND OVEN COMBINATION

[76] Inventor: Mae F. Franklin, P.O. Box 372, Greeleyville, S.C. 29056

[21] Appl. No.: 239,470

[22] Filed: May 9, 1994

[51] Int. Cl.⁶ .............................................. A47J 37/07
[52] U.S. Cl. ...................................... 99/450; 99/482; 99/480; 126/25 R
[58] Field of Search ................. 99/450, 482, 480, 352; 126/25 R, 25 B, 39 M

[56] References Cited

U.S. PATENT DOCUMENTS

| | | | |
|---|---|---|---|
| 1,751,219 | 3/1930 | Seamon | 99/450 |
| 3,266,409 | 8/1966 | Oyler | 99/480 |
| 3,455,233 | 7/1969 | Cable | 99/482 X |
| 3,517,602 | 6/1970 | Horton | 99/482 X |
| 3,601,280 | 8/1971 | Mills | 99/444 X |
| 3,933,144 | 6/1976 | Bandy | 99/352 X |
| 4,434,781 | 3/1984 | Koziol | 126/25 R |
| 4,471,748 | 9/1984 | Venable | 99/482 X |
| 4,690,125 | 9/1987 | Beller | 99/482 X |
| 4,810,510 | 3/1989 | Lever et al. | 99/482 X |
| 5,156,140 | 10/1992 | Zisman | 126/214 A |
| 5,158,066 | 10/1992 | Dodgen | 126/25 R |
| 5,176,067 | 1/1993 | Higgins | 99/482 X |
| 5,279,214 | 1/1994 | Lamendola | 99/482 X |

*Primary Examiner*—David A. Scherbel
*Assistant Examiner*—Patrick Brinson

[57] ABSTRACT

A grill and oven combination for cooking food comprising a container having a hollow interior bounded by a bottom portion and walls extended upwards therefrom to define an opening with one of the walls having a hole disposed thereon near the bottom portion; a lid pivotally connected to the container near the opening thereof and positionable in an opened orientation for allowing access to the interior of the container and a closed orientation for preventing access to the interior of the container; a heat-conductive liner disposed within the interior of the container along its inner periphery with a hole disposed thereon axially aligned with the hole on the wall of the container to define an access hole adapted for allowing combustible materials for cooking food to be added and combusted materials from cooking food to be removed; and a grill disposed within the liner adapted for holding food thereon for cooking.

1 Claim, 3 Drawing Sheets

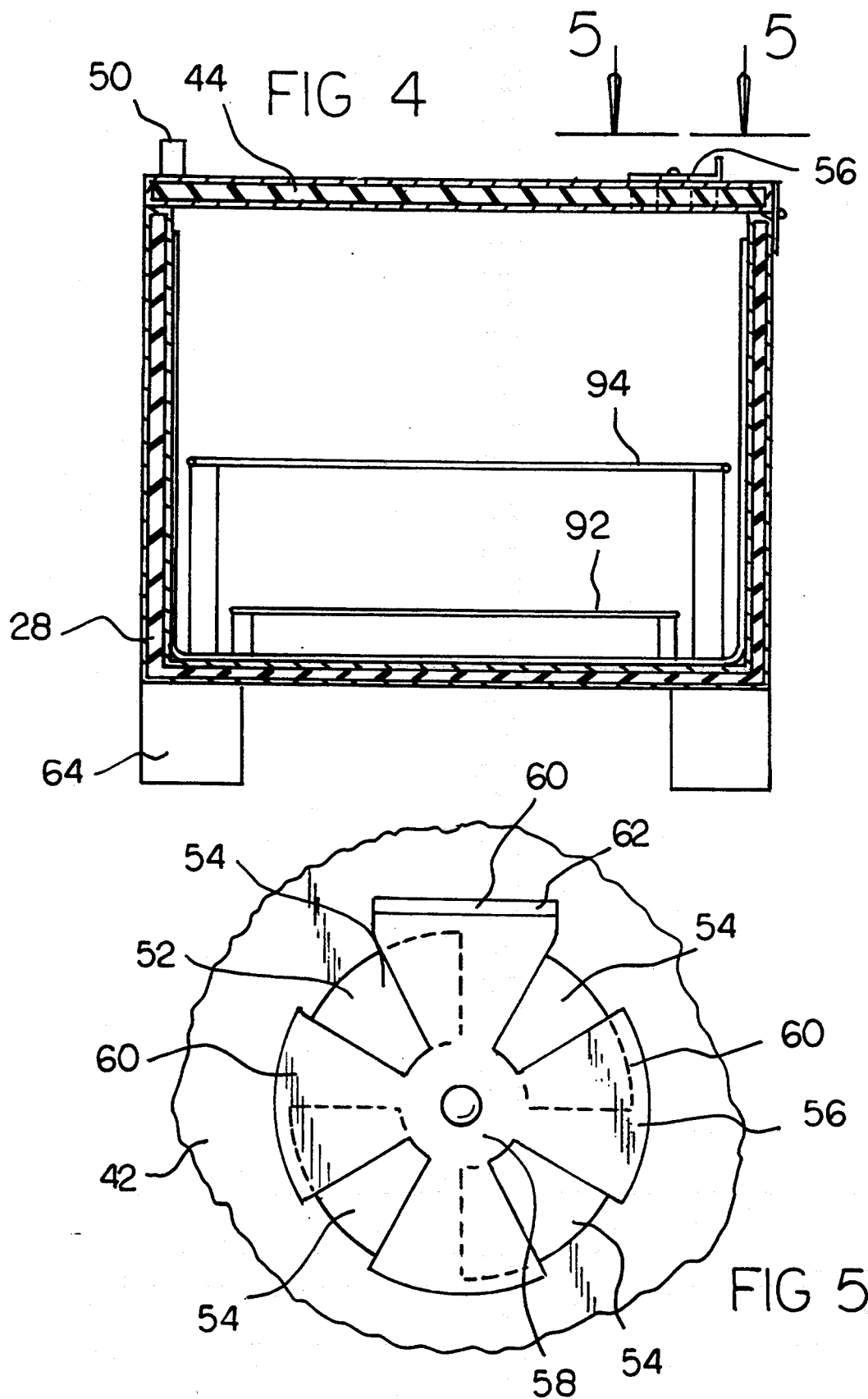

GRILL AND OVEN COMBINATION

BACKGROUND OF THE INVENTION

1. Field of the Invention

The present invention relates to a grill and oven combination and more particularly pertains to for cooking food with a grill and oven combination.

2. Description of the Prior Art

The use of grills and ovens is known in the prior art. More specifically, grills and ovens heretofore devised and utilized for the purpose of for cooking food are known to consist basically of familiar, expected and obvious structural configurations, notwithstanding the myriad of designs encompassed by the crowded prior art which have been developed for the fulfillment of countless objectives and requirements.

By way of example, U.S. Pat. 263,194 to Schwartz discloses a barbecue grill. U.S. Pat. No. 3,455,233 to Cable discloses a charcoal oven. U.S. Pat. No. 5,154,158 to Lindsey discloses a cooler and grill combination. U.S. Pat. No. 5,158,066 to Dodgen discloses a barbecue oven. U.S. Pat. No. 5,176,124 to Wrasse discloses a smoke free barbecue cooker.

While these devices fulfill their respective, particular objective and requirements, the aforementioned patents do not describe a grill and oven combination that allows a variety of foods to be cooked simultaneously and has insulated walls for containing heat therein for enabling efficient cooking operations.

In this respect, the grill and oven combination according to the present invention substantially departs from the conventional concepts and designs of the prior art, and in doing so provides an apparatus primarily developed for the purpose of for cooking food.

Therefore, it can be appreciated that there exists a continuing need for new and improved grill and oven combination which can be used for cooking food. In this regard, the present invention substantially fulfills this need.

SUMMARY OF THE INVENTION

In the view of the foregoing disadvantages inherent in the known types of grills and ovens now present in the prior art, the present invention provides an improved grill and oven combination. As such, the general purpose of the present invention, which will be described subsequently in greater detail, is to provide a new and improved grill and oven combination and method which has all the advantages of the prior art and none of the disadvantages.

To attain this, the present invention essentially comprises, in combination, a box-shaped container having a hollow interior bounded by a bottom wall with opposed front and rear walls and opposed side walls extended upwards therefrom to define an opening with each wall having a layer of insulation disposed therein adapted for containing heat within the interior and one of the side walls having a rectangular hole disposed thereon adjacent to the bottom wall. A top wall is included and hingeably connected to the container near the opening thereof to define a lid positionable in an opened orientation for allowing access to the interior of the container and a closed orientation for preventing access to the interior of the container with the lid having a layer of insulation disposed therein adapted for containing heat within the interior of the container. A handle is included and coupled to the top wall for allowing the lid to be positioned in the opened orientation or the closed orientation. A vent is included and disposed on the lid. The vent has four holes radially extended in quadrature adapted for allowing heat and cooking fumes to escape from the interior of the container. A vent cover is included and has a central portion pivotally connected to the lid between the four holes of the vent and four fins extended radially outward therefrom with one fin having an upwardly extended finger tab for allowing the vent cover to be placed in one orientation for opening the vent and another orientation for sealing the vent. Four rigid legs are included with each leg coupled to the bottom wall of the container near each corner thereof and extended downwards therefrom for placing the container in a generally level position. A box-shaped and heat-conductive liner is disposed within the interior of the container with the liner having a hollow interior bounded by a bottom wall with opposed front and rear walls and opposed side walls extended upwards therefrom to define an opening with one of the side walls having a rectangular hole disposed thereon axially aligned with the hole on the side wall of the container to define an access hole adapted for allowing combustible materials for cooking food to be added and combusted materials from cooking food to be removed. A door is hingeably connected to the side wall of the container near the hole with the door positionable in one orientation for allowing access to the interior of the liner through the access hole and another orientation for preventing access to the interior of the liner through the access hole. A rack is disposed within the interior of the liner near the bottom wall thereof for holding combustible materials for cooking food. Lastly, a grill is disposed within the interior of the liner having a rectangular and essentially planar mesh portion adapted for holding food thereon for cooking and four rigid legs extended downwards from each corner of the mesh for placing the mesh at a position above the rack and access hole.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved grill and oven combination which has all the advantages of the prior art grills and ovens and none of the disadvantages.

It is another object of the present invention to provide a new and improved grill and oven combination which may be easily and efficiently manufactured and marketed.

It is a further object of the present invention to provide a new and improved grill and oven combination which is of durable and reliable construction.

An even further object of the present invention is to provide a new and improved grill and oven combination which is susceptible of a low cost of manufacture with regard to both materials and labor, and which accordingly is then susceptible of low prices of sale to the consuming public, thereby making such a grill and oven combination economically available to the buying public.

Still yet another object of the present invention is to provide a new and improved grill and oven combination which provides in the apparatuses and methods of the prior art some of the advantages thereof, while simultaneously overcoming some of the disadvantages normally associated therewith.

Even still another object of the present invention is to provide a new and improved grill and oven combination for cooking food.

Lastly, it is an object of the present invention to provide a new and improved grill and oven combination comprising a container having a hollow interior bounded by a bottom portion and walls extended upwards therefrom to define an opening with one of the walls having a hole disposed thereon near the bottom portion; a lid pivotally connected to the container near the opening thereof and positionable in an opened orientation for allowing access to the interior of the container and a closed orientation for preventing access to the interior of the container; a heat-conductive liner disposed within the interior of the container along its inner periphery with a hole disposed thereon axially aligned with the hole on the wall of the container to define an access hole adapted for allowing combustible materials for cooking food to be added and combusted materials from cooking food to be removed; and a grill disposed within the liner adapted for holding food thereon for cooking.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is a cross-sectional view of the present invention taken along the line 4—4 of FIG. 1.

FIG. 5 is an enlarged view of the vent and vent cover of the present invention taken along the line 5—5 of FIG. 4.

The same reference numerals refer to the same parts through the various Figures.

DESCRIPTION OF THE PREFERRED EMBODIMENT

Figure 1:
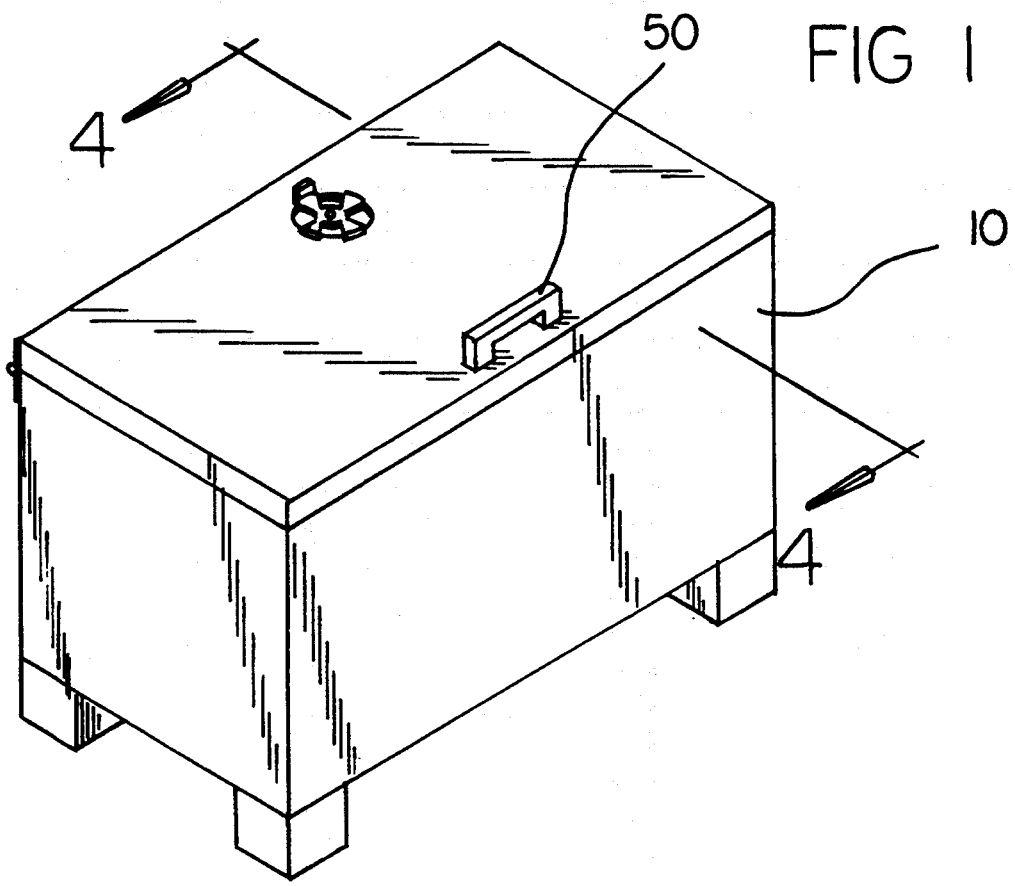
FIG. 1 is a perspective view of the preferred embodiment of the grill and oven combination constructed in accordance with the principles of the present invention.
Figure 2:
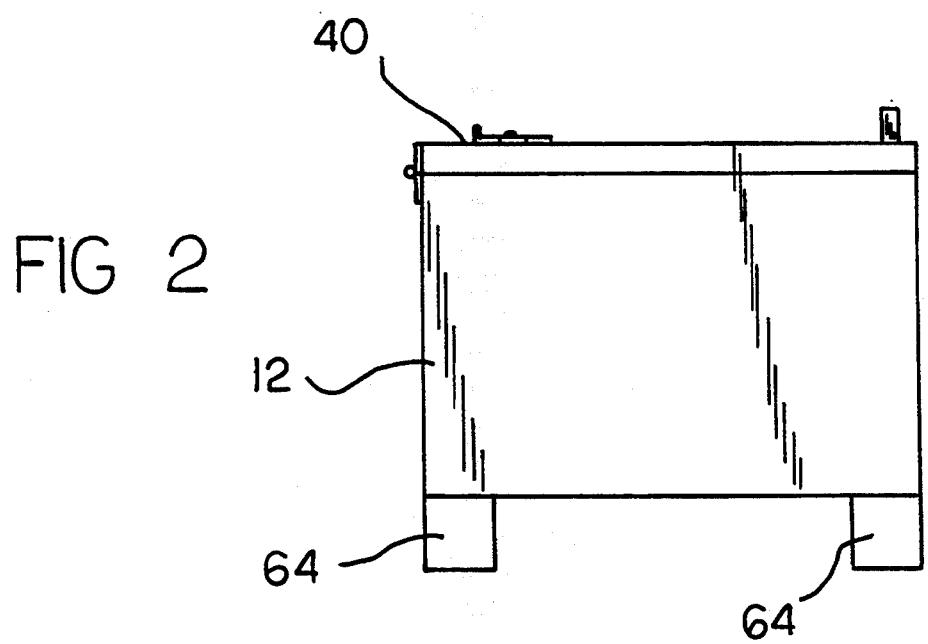
FIG. 2 is a side elevational view of the present invention.
Figure 3:
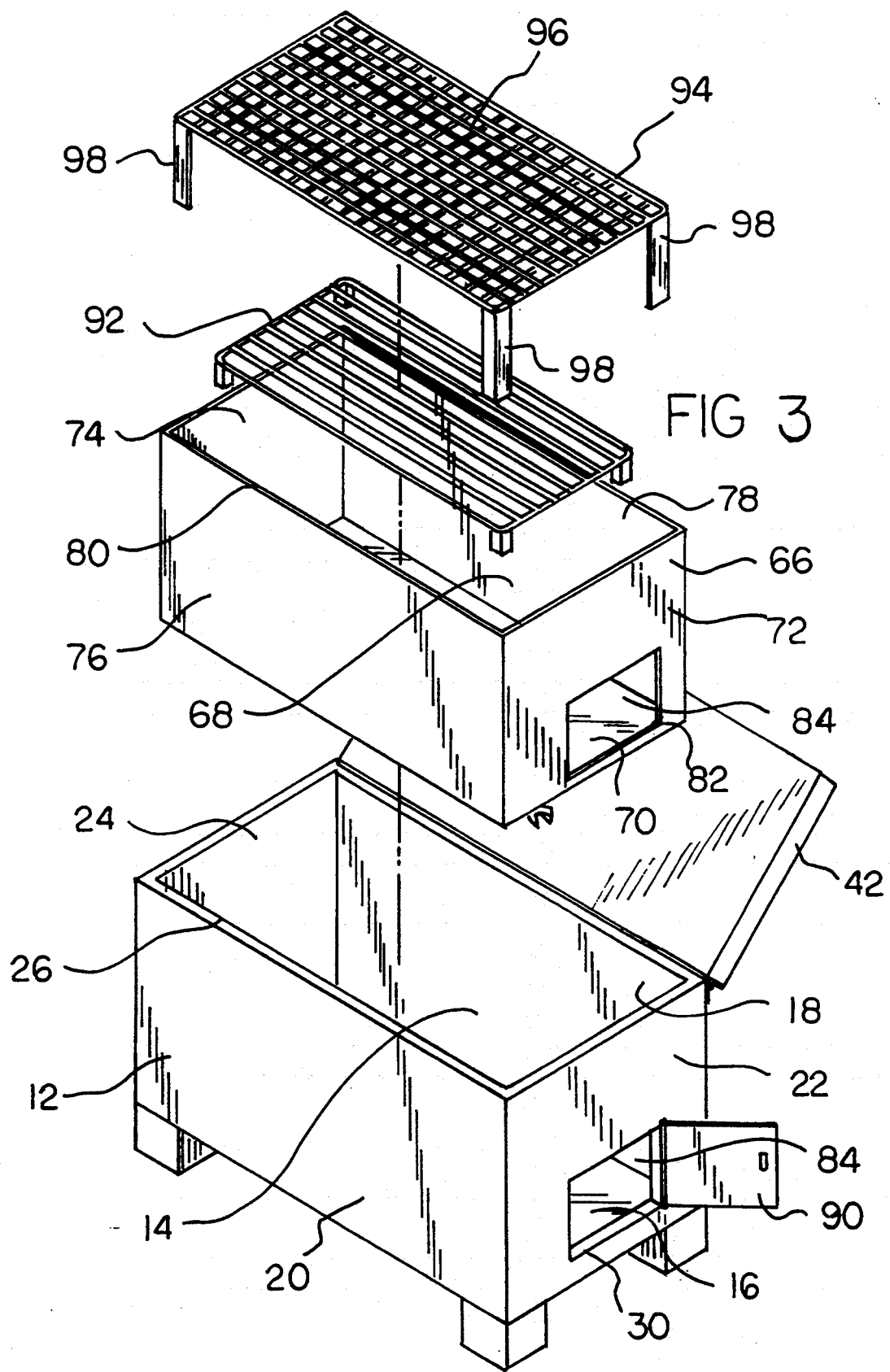
FIG. 3 is an exploded perspective view of the present invention.

With reference now to the drawings, and in particular, to FIG. 1 thereof, the preferred embodiment of the new and improved grill and oven combination embodying the principles and concepts of the present invention and generally designated by the reference number 10 will be described.

Specifically, the present invention includes 10 major components. The major components are the container, lid, handle, vent, vent cover, legs, liner, door, rack, and grill. These components are interrelated to provide the intended function.

More specifically, it will be noted in the various Figures that the first major component is the container 12. The container is box-shaped and rigid in structure. It has a hollow interior 14 bounded by a bottom wall 16 with opposed front and rear walls 18, 20 and opposed side walls 22, 24 extended upwards therefrom to define an opening 26. Each wall has a layer 28 of insulation disposed therein. The layers of insulation are adapted to contain heat within the interior of the container for allowing the present invention to be used for baking or roasting. The layers of insulation allow efficient cooking operations to take place. One of the side walls 22 has a rectangular hole 30 disposed thereon adjacent to the bottom wall. This hole allows access into the interior of the container.

The second major component is the lid 42. The lid is rigid in structure. The lid is defined by a top wall 40 hingeably connected to the container near the opening 26 thereof. The lid is positionable in an opened orientation for allowing access to the interior 14 of the container. The lid is also positionable in a closed orientation for preventing access to the interior of the container. The lid has a layer of insulation 44 disposed therein. The insulation is adapted for containing heat within the interior of the container, thereby allowing efficient cooking operations such as baking, roasting, or smoking when the lid is in a closed orientation. The layer of insulation also helps prevent the container or lid from becoming too hot and possibly burning a user who comes into contact with either of these components.

The third major component is the handle 50. The handle is rigid in structure. It is coupled to the top wall 40 for allowing the lid 42 to be positioned in the opened orientation or the closed orientation. The handle is positioned on the top wall near a peripheral edge thereof remote from the hingeable connection with the container, thereby allowing a user easy access thereto.

The fourth major component is the vent 52. The vent is disposed on the lid 42 on an edge thereof adjacent to the connection with the container. The lid has four holes 54 radially extended in quadrature. These holes are adapted for allowing heat and cooking fumes to escape from the interior 14 of the container.

The fifth major component is the vent cover 56. The vent cover is rigid in structure. It has a central portion 58 pivotally connected to the lid 42 between the four holes of the vent 52. Four fins 60 are extended radially outward from the central portion with one fin having an upwardly extended finger tab 62 thereon. This finger tab is adapted to be grasped by a user for placing the vent cover in one orientation for opening the vent 52 and another orientation for sealing the vent. The vent cover is adapted to be positioned in a variety of orientations between the opened and closed orientation for controlling the flow of smoke and heat from the container.

The sixth major component is the legs 64. The present invention includes 4 legs. They are rigid in structure. Each leg is coupled to the bottom wall 16 of the container near each corner thereof. They are then extended downwards from the bottom wall and adapted for placing the container in a generally level position.

The seventh major component is the liner 66. The liner is rigid and box-shaped in structure. It is also made of heat-conductive materials. It is disposed within the interior of the container 12. The liner has a hollow interior 68 bounded by a bottom wall 70 with opposed front and rear walls 72, 74 and opposed side walls 76, 78 extended upwards therefrom to define an opening 80. One of the side walls 72 has a rectangular hole 82 disposed thereon. This hole is axially aligned with the hole 30 on the side wall 22 of the container to define an access hole 84. This access hole is used for adding combustible materials within the liner for cooking food or removing combusted materials from the liner.

The eighth major component is the door 90. The door is rigid in structure. It is hingeably connected to the side wall 22 of the container near the hole 30. The door is positionable in one orientation for allowing access to the interior of the liner through the access hole. The door is also positionable in another orientation for preventing access to the interior of the liner through the access hole.

The ninth major component is the rack 92. The rack is disposed within the interior 68 of the liner 66. It is positioned near the bottom wall 70 of the liner. The rack is adapted for holding combustible materials such as wood or charcoal thereon for cooking food.

The tenth major component is the grill 94. The grill is rigid in structure. It is disposed within the interior 68 of the liner 66. The grill has a rectangular and essentially planar mesh portion 96. This mesh portion is used for holding food thereon for cooking. The grill also includes four rigid legs 98. These legs are extended downwards from each corner of the mesh. The legs are adapted for placing the mesh at a position above the rack 92 and access hole 84.

The present invention is a combination charcoal grill and oven. It grills, bakes, broils, steams, and deep fries food. The present invention allows the fats contained within meats to run-off during cooking, thus reducing the fat content of the cooked meat. The present invention is similar in size and shape to a refrigerator, but set on its side. It is manufactured from corrosion resistant metals and heat resistant insulating material, and is supported on four legs. The unit is fully insulated around its exterior, with approximately 1½ to 2 inches of insulation contained within each wall. A tin liner completely lines the inside of the container. A raised metal rack for the charcoal is located within the linear near the bottom thereof. A cooking grill is positioned above the charcoal rack about halfway up the liner. A lid opens for allowing access to the food and to the cooking grill for removal and cleaning. There is a door on the side for allowing access to the coals and spent ash. A vent is located in the lid for allowing smoke, steam, and excess heat to exit.

By utilizing the present invention, a user could be cooking a complete meal at one time, i.e., the meat, vegetables, potatoes, and bread, albeit at different cooking durations. The advantages the present invention has over similar products is that it can bake, roast, broil, steam, or deep fry food in less time due to the efficient containment of heat therein. At the same time, it is designed to cook healthier and tastier foods which would contain less fat.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A grill and oven combination for cooking food comprising, in combination:
 a box-shaped container having a hollow interior bounded by a bottom wall with opposed front and rear walls and opposed side walls extended upwards therefrom to define an opening with each wall having a layer of insulation with a thickness of between about 1½ inches to 2 inches disposed therein adapted for containing heat within the interior and one of the side walls having a rectangular hole disposed thereon adjacent to the bottom wall;
 a rectangular flat top wall hingeably connected to the container near the opening thereof to define a lid positionable in an opened orientation for allowing access to the interior of the container and a closed orientation for preventing access to the interior of the container and with the lid having a layer of insulation with a thickness of between about 1½ inches to 2 inches disposed therein adapted for containing heat within the interior of the container;

a handle coupled to the top wall for allowing the lid to be positioned in the opened orientation or the closed orientation;

a vent disposed on the lid having four holes radially extended in quadrature adapted for allowing heat and cooking fumes to escape from the interior of the container;

a vent cover having a central portion pivotally connected to the lid between the four holes of the vent and four fins extended radially outwards therefrom with one fin having an upwardly extended finger tab for allowing the vent cover to be placed in one orientation for opening the vent and another orientation for sealing the vent;

four rigid legs with each leg having a rectangular cross section and with each leg coupled to the bottom wall of the container near each corner thereof and extended downwards therefrom for placing the container in a generally level position;

a box-shaped and heat-conductive liner disposed within the interior of the container, the liner having a hollow interior bounded by a bottom wall with opposed front and rear walls and opposed side walls extended upwards therefrom to define an opening with one of the side walls having a rectangular hole disposed thereon axially aligned with the hole on the side wall of the container to define an access hole for allowing combustible materials for cooking food to be added and combusted materials from cooking food to be removed;

a rectangular planar door hingeably connected to the side wall of the container near the hole with the door positionable in one orientation for allowing access to the interior of the liner through the access hole and another orientation for preventing access to the interior of the liner through the access hole;

a rectangular rack with four legs extended downwardly from the corners thereof disposed within the interior of the liner near the bottom wall thereof adapted for holding combustible materials thereon for cooking food; and a grill disposed within the interior of the liner having a rectangular and essentially planar mesh portion adapted for holding food thereon for cooking and four rigid legs extended downwards from each corner and thereby placing the mesh at a position directly above the rack and offset above the access hole.

* * * * *